United States Patent [19]
Fujisawa et al.

[11] Patent Number: 5,729,618
[45] Date of Patent: Mar. 17, 1998

[54] IMAGE FORMING APPARATUS FOR OUTPUTTING EQUIVALENTS OF WORDS SPELLED IN A FOREIGN LANGUAGE

[75] Inventors: Tetsuo Fujisawa, Urawa; Takako Sato, Yokohama, both of Japan

[73] Assignee: Ricoh Company, Ltd., Tokyo, Japan

[21] Appl. No.: 407,054

[22] Filed: Mar. 17, 1995

Related U.S. Application Data

[63] Continuation of Ser. No. 60,543, May 13, 1993, abandoned.

[30] Foreign Application Priority Data

May 13, 1993 [JP] Japan ..................... 4-146213

[51] Int. Cl.$^6$ ............................ G06K 9/00; G06F 17/28
[52] U.S. Cl. .................. 382/100; 395/753; 395/760
[58] Field of Search ............... 364/419.01, 419.02, 364/419.03, 419.05, 419.07; 382/100, 112, 114, 177, 229, 309; 395/751, 752, 753, 755, 757, 760

[56] References Cited

U.S. PATENT DOCUMENTS

| | | | |
|---|---|---|---|
| 4,890,230 | 12/1989 | Tanoshima et al. | 364/419 |
| 5,075,850 | 12/1991 | Asahioka et al. | 364/419 |
| 5,140,522 | 8/1992 | Ito et al. | 364/419 |
| 5,185,821 | 2/1993 | Yoda | 382/61 |
| 5,222,160 | 6/1993 | Sakai et al. | 382/57 |
| 5,303,151 | 4/1994 | Neumann | 364/419.02 |
| 5,349,368 | 9/1994 | Takeda et al. | 345/115 |
| 5,373,441 | 12/1994 | Hirai et al. | 364/419.02 |
| 5,517,409 | 5/1996 | Ozawa et al. | 364/419.03 |

*Primary Examiner*—Andrew Johns
*Attorney, Agent, or Firm*—Oblon, Spivak, McClelland, Maier & Neustadt, P.C.

[57] ABSTRACT

An image forming apparatus operable with digital image data and capable of outputting equivalents of words spelled in a foreign language. Characters are recognized out of image data optically read out of a document image by a scanner or image data received over a subscriber line. Words are separated from the sequences of recognized characters. The equivalent of each word is searched for and then outputted together with the matching word. Paragraphs are separated from the image data and provided with serial paragraph numbers. The paragraph numbers are added to the image data before the generation of an image.

12 Claims, 15 Drawing Sheets

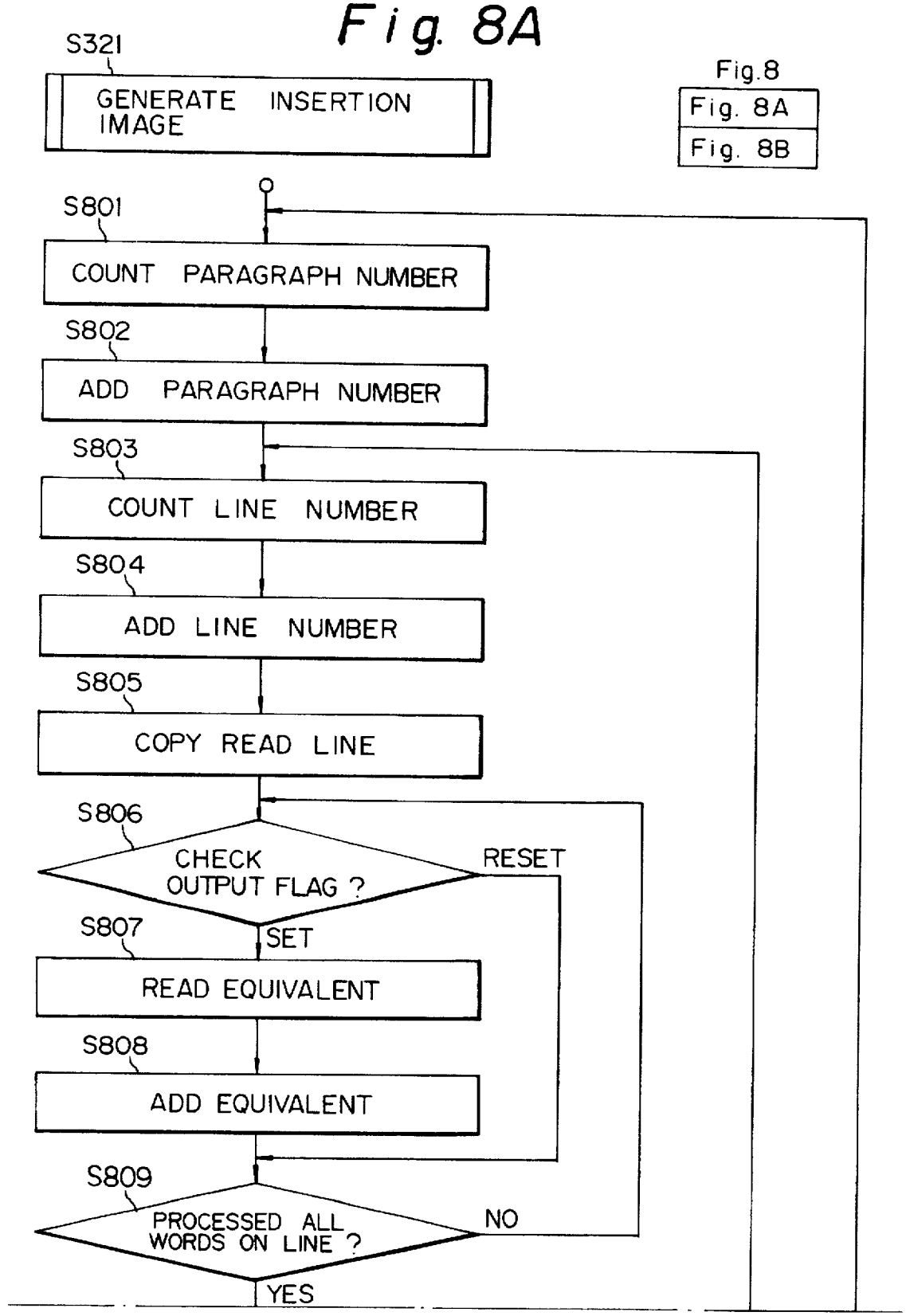

Fig. 9

This is a title

An object-based hierarchy includes data items derived from a single abstract base class.

Chapter 1
An object-based hierarchy includes data items derived from a single abstract base class.
An object-based hierarchy includes data items derived from a single abstract base class.
An object-based hierarchy includes data items derived from a single abstract base class.

Chapter 2
An object-based hierarchy includes data items derived from a single abstract base class.
An object-based hierarchy includes data items derived from a single abstract base class.
An object-based hierarchy includes data items derived from a single abstract base class.
An object-based hierarchy includes data items derived from a single abstract base class.

Chapter 3
An object-based hierarchy includes data items derived from a single abstract base class.
An object-based hierarchy includes data items derived from a single abstract base class.

AAAAAAAAAI

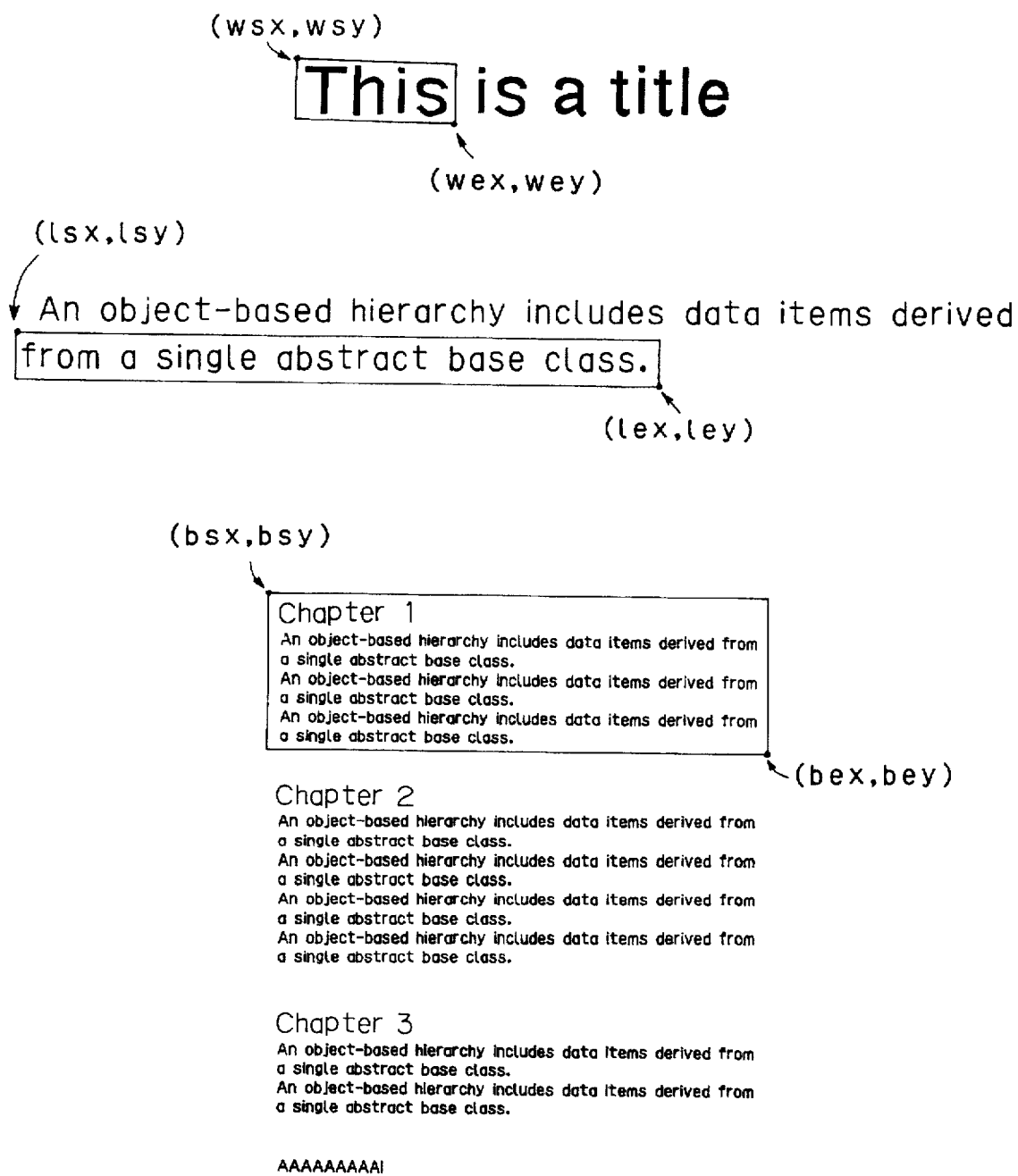

*Fig. 11*

1 This is a title

2 An object-based hierarchy includes data items derived from a single abstract base class.

3 hapter 1
An object-based hierarchy includes data items derived from a single abstract base class.
An object-based hierarchy includes data items derived from 5 ingle abstract base class.
An object-based hierarchy includes data items derived from a single abstract base class.

4 hapter 2
An object-based hierarchy includes data items derived from a single abstract base class.
An object-based hierarchy includes data items derived from 5 ingle abstract base class.
An object-based hierarchy includes data items derived from a single abstract base class.
An object-based hierarchy includes data items derived from a single abstract base class.

5 hapter 3
An object-based hierarchy includes data items derived from a single abstract base class.
An object-based hierarchy includes data items derived from 5 ingle abstract base class.

6 AAAAAAl

Fig. 12

This is a title
これ 題目
表題

---

2 An object-based hierarchy includes data items derived
階級制度 含む 資料 項目 推論する
情報 from a single abstract base class.
唯一の 抽象的な 基礎
ぼんやりした 根拠

---

3 Chapter 1
章

An object-based hierarchy includes data items derived from
階級制度 含む 資料 項目 推論する
情報 a single abstract base class.
唯一の抽象的な基礎
根拠

An object-based hierarchy includes data items derived from
階級制度 含む 資料 項目 推論する
情報

5   a single abstract base class.
唯一の抽象的な基礎
根拠

An object-based hierarchy includes data items derived from
階級制度 含む 資料 項目 推論する
情報 a single abstract base class.
唯一の抽象的な基礎
根拠

---

An object-based hierarchy includes data items derived from
階級制度 含む 資料 項目 推論する
情報 a single abstract base class.
唯一の抽象的な基礎
根拠

An object-based hierarchy includes data items derived from
階級制度 含む 資料 項目 推論する
情報

5   a single abstract base class.
唯一の抽象的な基礎
根拠

---

6 AAAAAAAAA!
ああああ

---

4 Chapter 2
章

An object-based hierarchy includes data items derived from
階級制度 含む 資料 項目 推論する
情報 a single abstract base class.
唯一の抽象的な基礎
根拠

An object-based hierarchy includes data items derived from
階級制度 含む 資料 項目 推論する
情報

5   a single abstract base class.
唯一の抽象的な基礎
根拠

An object-based hierarchy includes data items derived from
階級制度 含む 資料 項目 推論する
情報 a single abstract base class.
唯一の抽象的な基礎
根拠

An object-based hierarchy includes data items derived from
階級制度 含む 資料 項目 推論する
情報 a single abstract base class.
唯一の抽象的な基礎
根拠

---

5 Chapter 3
章

IMAGE FORMING APPARATUS FOR OUTPUTTING EQUIVALENTS OF WORDS SPELLED IN A FOREIGN LANGUAGE

This application is a continuation of application Ser. No. 08/060,543, filed on May 13, 1993, now abandoned.

BACKGROUND OF THE INVENTION

The present invention relates to a copier, facsimile apparatus or similar image forming apparatus operable with digital image data and capable of outputting equivalents for words spelled in a foreign language. More particularly, the present invention is concerned with an image forming apparatus of the type optically reading an original document to produce image data or receiving image data over a communication line, recognizing words included in the image data, and printing the words and their equivalents on a recording medium.

Generally, even a person familiar with a given foreign language often fails to proceed with reading a document spelled in the foreign language simply because some particular words are not understood. Then, the only course is to look the words in a dictionary to find the meanings of the unknown words. In light of this, Japanese Patent Laid-Open Publication No. 154845/1987, for example, proposes a copier capable of automatically translating a document printed in a foreign language before outputting it. This copier with an automatic translating function has image reading means for reading an original image, recognizing means for distinguishing graphic data and text data included in the resulting image data, and translating means for recognizing text data character by character and translating them into the mother language. The original image and the translated image are outputted together. This is successful in saving time and labor for looking up the words in a dictionary.

However, considering errors particular to the state of the art automatic translation technologies and costs, the copier with a translation capability described above is redundant for many persons who have a given level of knowledge. Further, with the conventional apparatus, it is impossible to clearly lay out equivalents in relation to their associated words when a document image includes a number of paragraphs. When equivalents are added to a document, it is likely that the contents of an output image are noticeably changed and become extremely difficult to read. Moreover, it has been customary to use an input image memory storing read image data as a work area or an output image memory at the same time. This brings about a drawback that since the image data are lost as the processing proceeds, they cannot be processed afterwards unless the document is read again, resulting in slow processing.

SUMMARY OF THE INVENTION

It is therefore an object of the present invention to provide an image forming apparatus capable of positioning equivalents of words in an intelligible layout, outputs an easy-to-read reproduction even when the contents are noticeably changed due to equivalents, and realizes high speed processing.

In accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing section for storing the words separated by the word separating section and equivalents for the words, an equivalent searching section for searching for the equivalent of the word read out of the equivalent storing section, an output image generating section for outputting the equivalent searched for by the equivalent searching section together with the word corresponding to the equivalent, a paragraph separating section for separating paragraphs included in the image data, a paragraph number adding section for adding paragraph numbers to the paragraphs separated by the paragraph separating section, and an image generating section for generating an image by adding the paragraph numbers to the image data.

Also, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing section for storing the words separated by the word separating section and equivalents for the words, an equivalent searching section for searching for the equivalent of the word read out of the equivalent storing section, an output image generating section for outputting the equivalent searched for by the equivalent searching section together with the word corresponding to the equivalent, a line recognizing section for recognizing lines on the basis of the image data, a line number adding section for adding line numbers to the lines recognized by the line recognizing section, and an image generating section for generating an image by adding the line numbers to the image data.

Also, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing section for storing the words separated by the word separating section and equivalents for the words, an equivalent searching section for searching for the equivalent for the word read out of the equivalent storing section, an output image generating section for outputting the equivalent searched for by the equivalent searching section together with the word corresponding to the equivalent, and a page number adding section for adding a page number to the image generated by the output image generating section.

Also, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing means for storing the words separated by the word separating means and equivalents for the words, an equivalent searching section for searching for the equivalent for the word read out of the equivalent storing section, an output image generating section for outputting the equivalent searched for by the equivalent searching section together with the word corresponding to the equivalent, and an equivalent combining section for outputting the equivalent outputted by the output image generating section under the word corresponding to the equivalent while centering the equivalent with respect to the word.

Also, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing section for storing the words separated by the word separating section and equivalents of the words, an equivalent searching section for searching for the equivalent of the word read out of the equivalent storing section, an output image generating section for outputting the equivalent searched for by the equivalent searching section together with the word corresponding to the equivalent, and a copying section for copying the word corresponding to the word to be outputted by the output image generating section on the basis of the image data.

Further, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing section for storing the words separated by the word separating section and equivalents of the words, an equivalent searching section for searching for the equivalent of the word read out of the equivalent storing section, an output image generating section for outputting the equivalent searched for by the equivalent searching section together with the word corresponding to the equivalent, a part of speech determining section for determining a part of speech of the word searched for by the equivalent searching section on the basis of an inflection, and an equivalent reading section for reading out an equivalent matching the part of speech determined by the part of speech determining section.

Furthermore, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing section for storing the words separated by the word separating section and equivalents of the words, an equivalent searching section for searching for the equivalent of the word read out of the equivalent storing section, an output image generating section for outputting the equivalent searched for by the equivalent searching section together with the word corresponding to the equivalent, and a control section for controlling the storage of the equivalent on the basis of an output attribute given to the equivalent.

Moreover, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing means, a character recognizing section for recognizing characters included in the image data read by the image reading means or the image data received over the communication line, a word separating section for separating words on the basis of the characters recognized by the character recognizing section, an equivalent storing section for storing the words separated by the word separating section and equivalents of the words, an equivalent searching section for searching for the equivalent of the word read out of the equivalent storing section, an output image generating section for outputting the equivalent searched for by the equivalent searching section together with the word corresponding to the equivalent, and a control section for storing equivalents which have already occurred before an equivalent of interest to thereby control the output of the equivalent of interest.

In addition, in accordance with the present invention, an image forming apparatus having an interlinear function comprises an image reading section for optically reading a document image to convert it to corresponding image data, an image storing section for storing the image data read by the image reading section or image data received over a communication line, an image processing section for executing various kinds of image processing with the image data to produce an image signal, an image recording section for recording an image on a recording medium in response to the image signal from the image processing section, a character recognizing section for recognizing characters included in the image data read by the image reading section or the image data received over the communication line, a word separating section for separating words on the basis of the characters recognized by the character recognizing section, an equivalent storing section for storing the words separated by the word separating section and equivalents for the words, an equivalent searching section for searching for the equivalent of the word read out of the equivalent storing section, an output image generating section for outputting the equivalent searched for by the equivalent searching section together with the word corresponding to the equivalent, a part of speech determining section for determining a part of speech of the word searched for by the equivalent searching section on the basis of an inflection, and an output image memory to be used by the output image generating section independently of an input image memory to be used by the image storing section.

BRIEF DESCRIPTION OF THE DRAWINGS

The above and other objects, features and advantages of the present invention will become more apparent from the following detailed description taken with the accompanying drawings in which:

FIG. 9 shows a specific document image;

FIG. 10 shows the image of FIG. 9 marked by coordinates;

FIG. 11 shows the image of FIG. 9 to which paragraph numbers are added; and

FIG. 12 shows a specific image printed after a procedure particular to the present invention has been executed with the image of FIG. 9.

DESCRIPTION OF THE PREFERRED EMBODIMENTS

An image forming apparatus with an interlinear function embodying the present invention will be described hereinafter.

(1) General Construction

Figure 1:
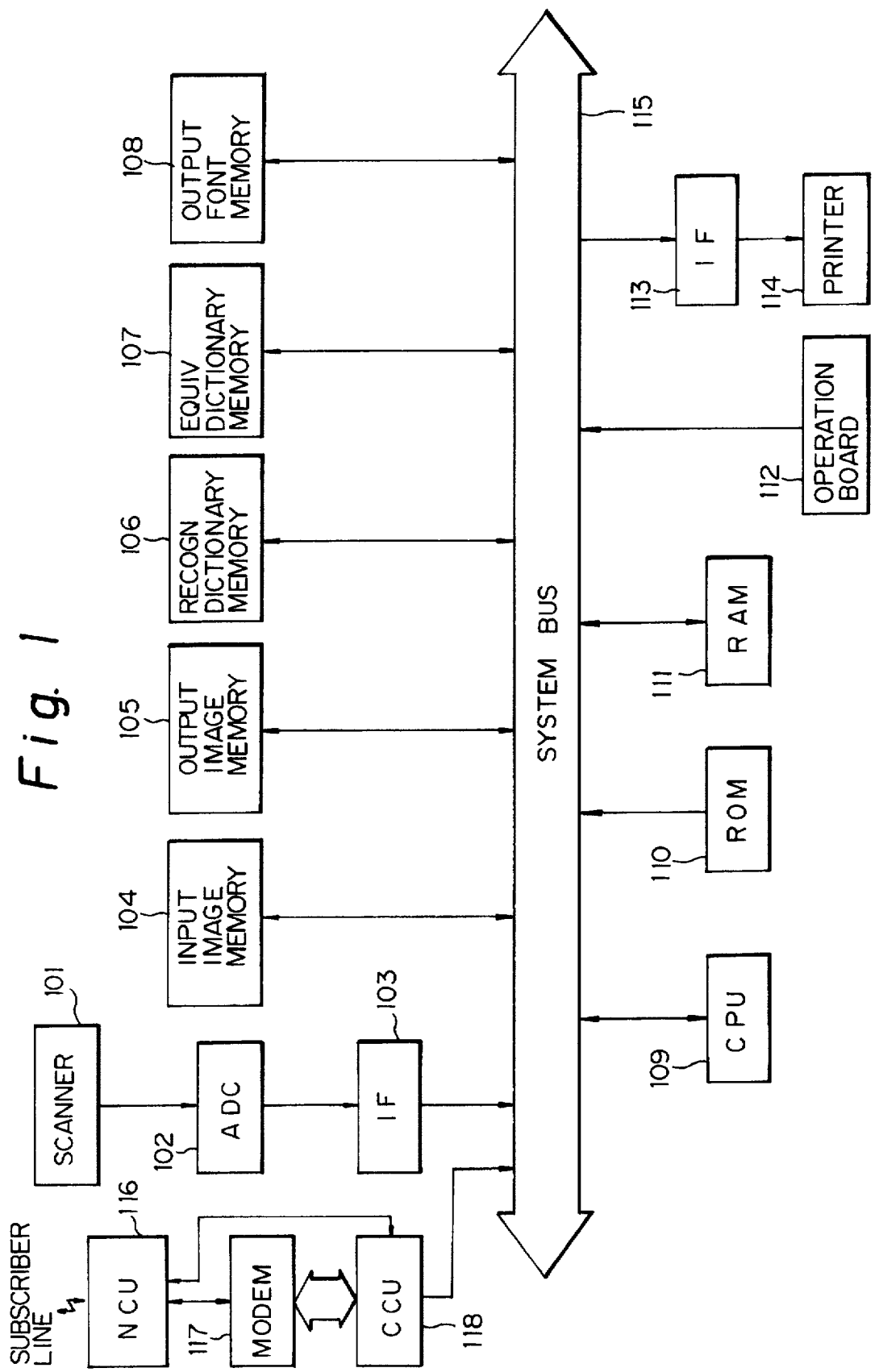
FIG. 1 is a block diagram schematically showing an image forming apparatus having an interlinear function embodying the present invention.

Referring to FIG. 1 of the drawings, the apparatus embodying the present invention includes a scanner 101 for reading a document image. A CPU (Central Processing Unit) 109 controls the entire apparatus. A ROM (Read Only Memory) 110 stores a control program. A RAM (Random Access Memory) 111 is used by the control program, as needed. An input image memory 104 stores an image read by the scanner 101 while an output image memory 105 stores an image to be outputted. A recognition dictionary memory 106 stores data for implementing character recognition. An equivalent dictionary memory 107 stores words and their equivalents in pairs. An output font memory 108 stores character font data for generating an image. Such units, as well as others which will be described, interchange data over a system bus 115. An analog-to-digital converter (ADC) 102 transforms an analog signal to a digital signal. Interfaces (IFs) 103 and 113 respectively interface the ADC 102 and a printer 114 to the system bus 115. The printer 114 prints an image stored in the output image memory 105 on a recording medium, e.g., a paper sheet. An operation board 112 is accessible for entering various commands including a start command and a stop command.

The apparatus also has a facsimile communication function. Specifically, an NCU (Network Control Unit) 116 selectively connects or disconnects a subscriber line, sends a dial signal, detects a ringing frequency, and performs other various operations. A modem (modulator/demodulator) 117 modulates data to be sent over the subscriber line (analog line) or demodulates data received over the subscriber line. A CCU (Communication Control Unit) 118 preprocesses data to be sent over the subscriber line, e.g., recompresses data or reduces magnification to match them to a remote facsimile station. The rest of the facsimile is function conventional and will not be described herein.

(2) Scanner 101 and Printer 114

Figure 2:
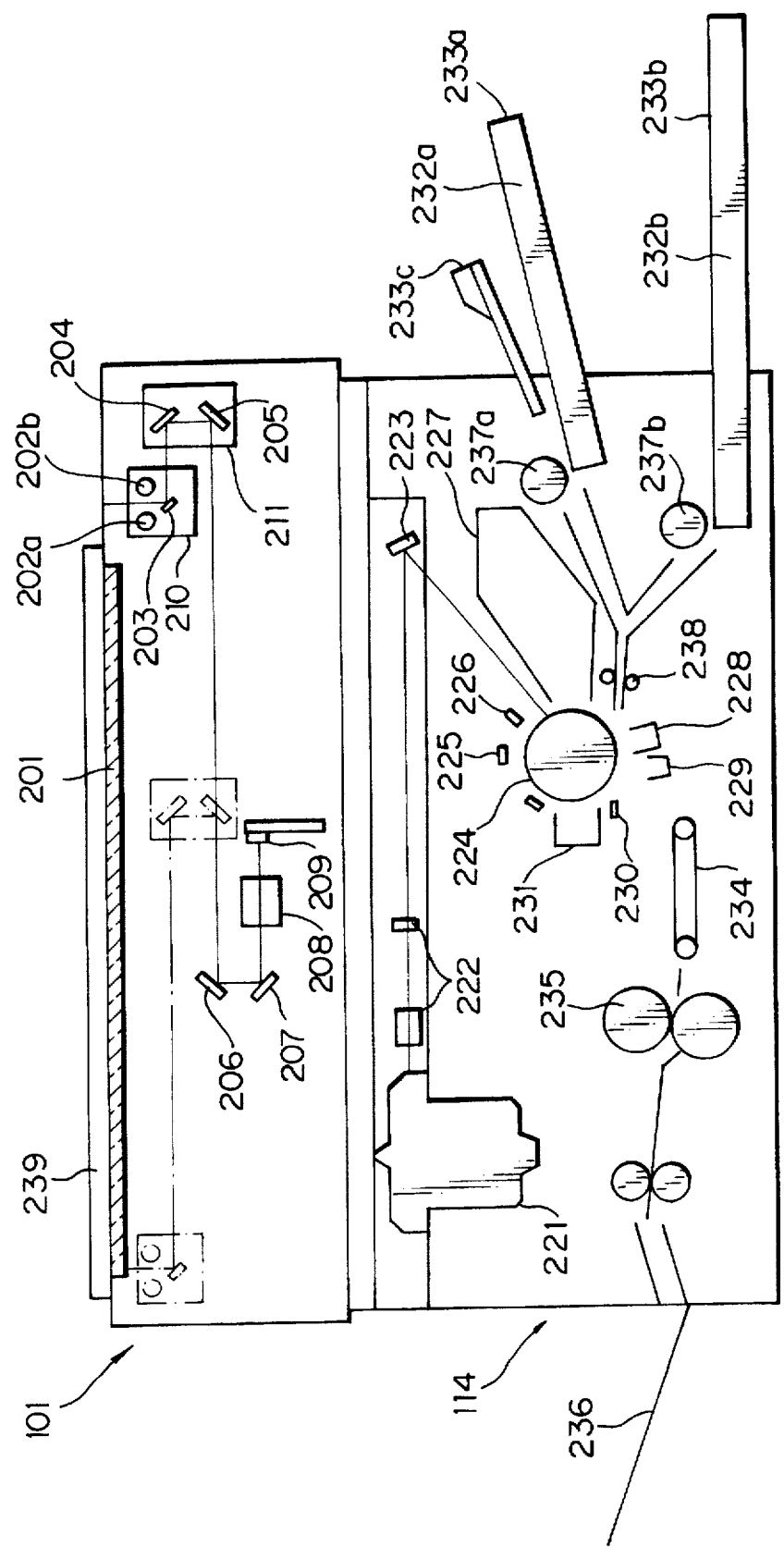
FIG. 2 is a section of a copier which is a specific form of the apparatus of the present invention.

As shown in FIG. 2, the scanner 101 includes a glass platen 201 on which an original document is laid. Light sources 202a and 202b illuminate the document via the glass platen 201. The resulting reflection from the document is focused onto the photosensitive surface of a CCD (Charge Coupled Device) image sensor 209 via mirrors 203–207 and a lens 208. The light sources 202a and 202b are mounted on a carriage 210 which is movable below and in parallel with the glass platen 201 in the subscanning direction. The mirrors 204 and 205 are mounted on another carriage 211 movable in association with and at half the speed of the carriage 210 in the subscanning direction. Main scanning is implemented by the solid sate scanning of the CCD image sensor 209. While the image Sensor 209 reads the document image, the above-mentioned optics are moved to scan the entire document. Designated by the reference numeral 239 in the figure is a cover plate for pressing the document from above.

The printer 114 is generally made up of a laser writing section, an image reproducing section, and a sheet feeding section. The laser writing section has a laser output unit 221, a focusing lens 222, and a mirror 223. The laser output unit 221 incorporates a laser diode and a polygonal mirror which is rotated at high speed by a motor. A laser beam issuing from the laser writing section scans a photoconductive drum 224 included in the image forming section. Arranged around the drum 224 are a main charger 225, an eraser 226, a developing unit 227, a transfer charger 228, a separation charger 229, a separating member or separator 230, a cleaning unit 231, etc. A beam sensor, not shown, is located at a position close to one end of the drum 224 and where the laser beam is to be incident so as to generate a main scan synchronizing signal.

How the printer 114 reproduces an image will be outlined hereinafter. The main charger 225 uniformly charges the surface of the drum 224 to a high potential. As the laser beam scans the charged surface of the drum 224, it lowers the potential of the scanned portion of the drum 224. Since the laser beam is ON/OFF controlled in association with black/white to be reproduced, it forms a potential distribution representative of an image, i.e., an electrostatic latent image on the drum 224. As the latent image reaches the developing unit 227, the unit 227 deposits a toner on the latent image on the basis of the potential distribution, thereby producing a corresponding toner image. A sheet 232 is fed at a predetermined time from a cassette to the portion of the drum 224 where the toner image is present. Then, the transfer charger 228 transfers the toner image from the drum 224 to the sheet. The separation charger 229 and separator 230 cooperate to separate the sheet carrying the toner image thereon from the drum 224. A belt 234 transports the separated sheet to a fixing roller 235 which has a heater therein. After the toner image on the sheet has been fixed by the fixing roller 235, it is driven out of the printer 114 to a tray 236.

As shown in FIG. 2, the printer 114 has two sheet feed lines. One of the sheet feed lines extends from an upper cassette 233a and a manual insertion tray 233c. A sheet 232a set on the cassette 233a or the tray 233c is fed by a pick-up roller 237a. The other sheet feed line extends from a lower cassette 233b. A sheet 232b is fed from the lower cassette 233b by a pick-up roller 237b. The sheet 232a or 232b is first brought to a stop by a register roller 238 and then driven toward the drum 224 in synchronism with the rotation of the drum 224.

(3) CPU 109

Figure 3A:
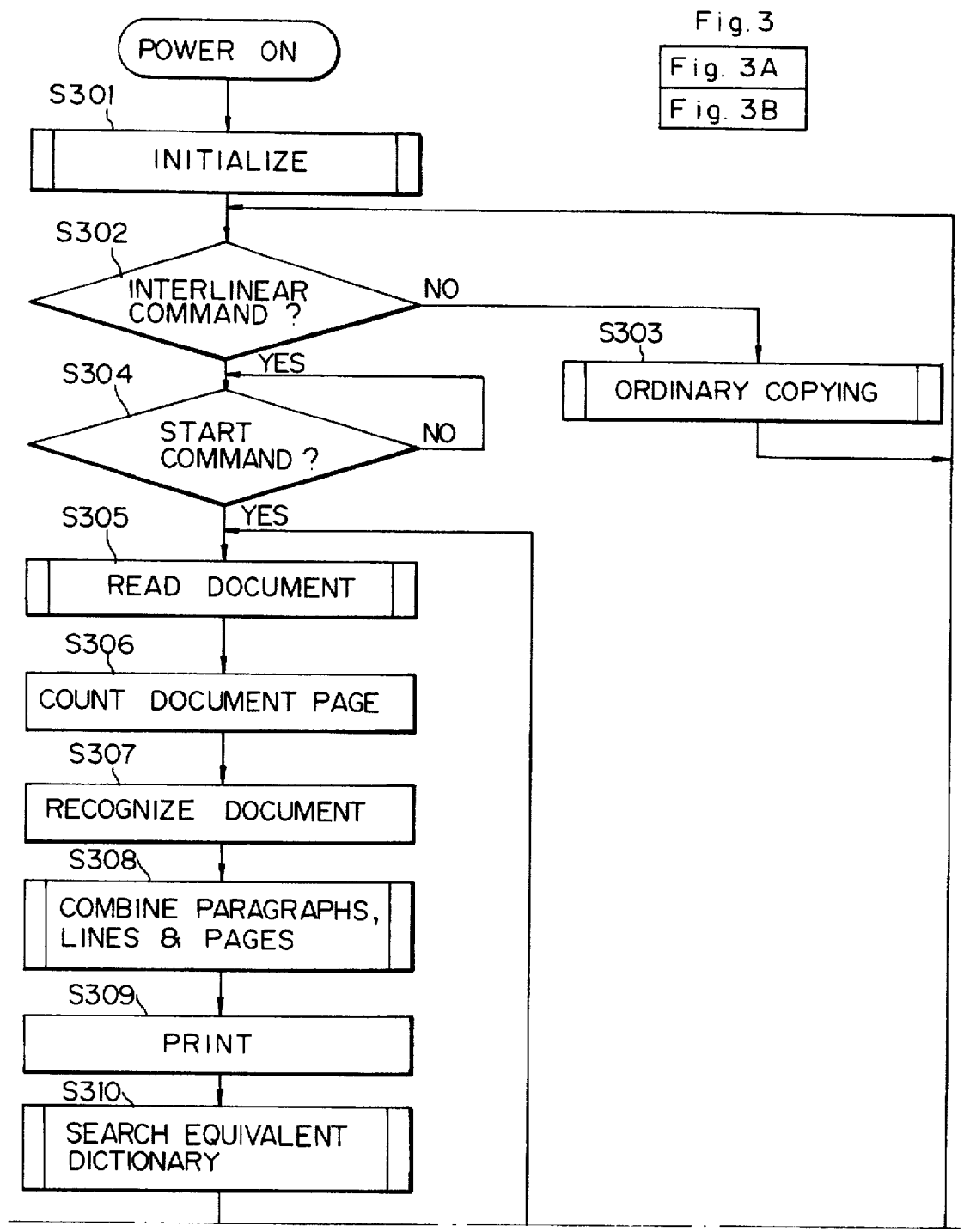
FIG. 3 is a flowchart representative of a main routine to be executed by the apparatus of FIG. 1.
Figure 3B:
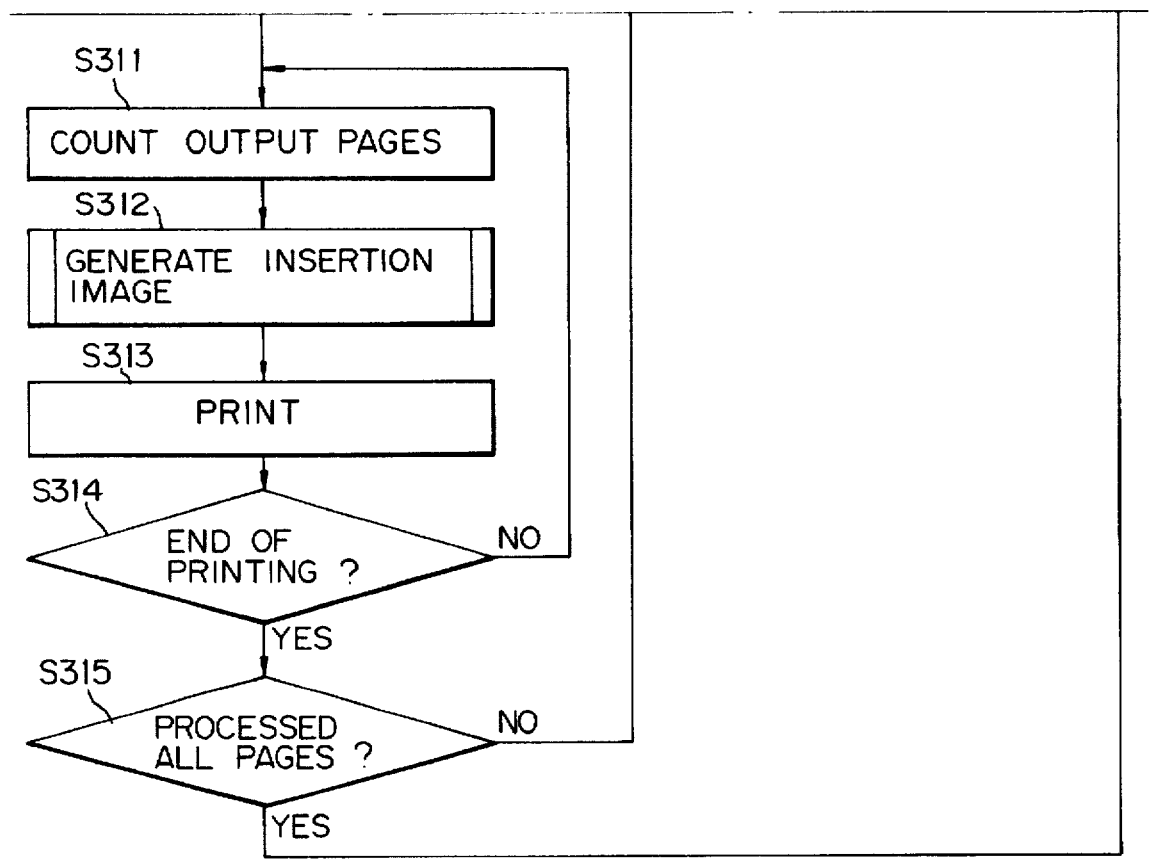

A specific operation of the CPU 109 will be described with reference to FIGS. 3–8. As shown in FIG. 3, upon turn-on of a power switch, the CPU 109 initializes the processing mode as well as other modes (step S301). Then, the CPU 109 determines whether or not an interlinear command has been entered on the operation board 112 (S302). If the answer in step S302 is negative, the CPU 109 executes an ordinary copy procedure (S303) and again awaits an interlinear command (S302). When an interlinear command is entered (Yes, S302), the CPU 109 determines whether or not a start command has been inputted on the operation board 112 (S304). If a start command has been entered (Yes, S304), the CPU 109 causes the scanner 101 to read a document laid on the glass platen 201 (S305) and stores the resulting image data in the input image memory 104. Subsequently, the CPU 109 counts the page of the document (S306) and then executes a document recognition subroutine (S307).

(3)-(i) Document Recognition

Figure 4:
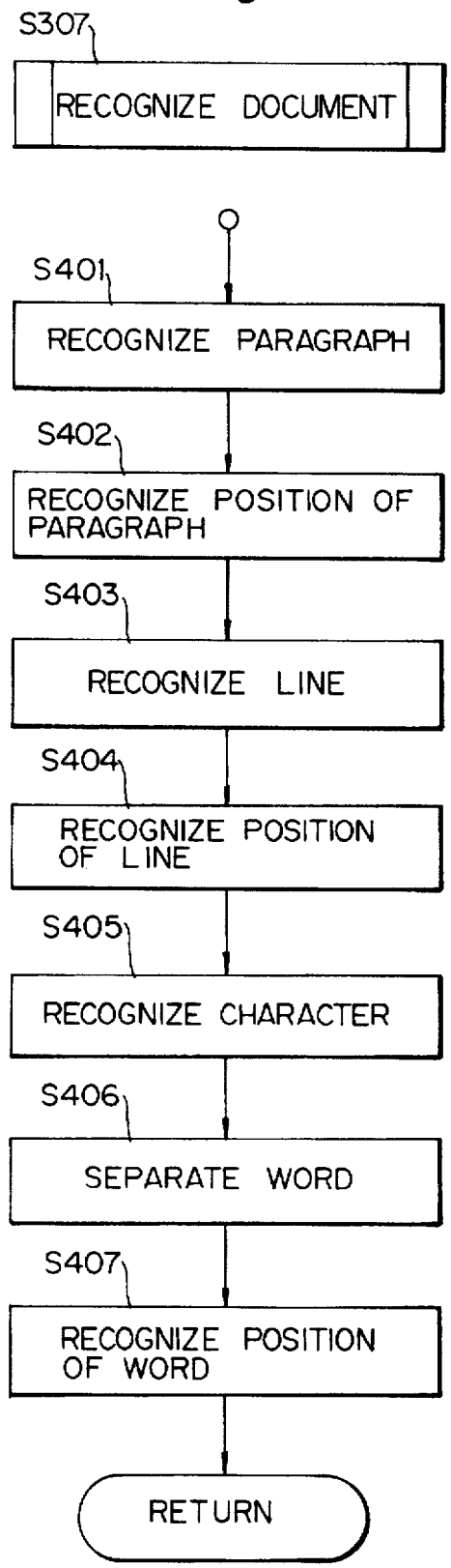
FIGS. 4–8 are flowcharts demonstrating subroutines included in the main routine of FIG. 3.

FIG. 4 shows the document recognition subroutine (S307) specifically. As shown, this routine begins with a step S401 for recognizing a paragraph. To recognize a paragraph, the CPU 109 detects an area where no image data exist, i.e., a white area and which extends more than a particular distance in each of the main and subscanning directions. Then, the CPU 109 determines the position of the recognized paragraph in the image (S402). Specifically, the CPU 109 gives coordinates to the image data read by the scanner 101 and stored in the input image memory 104 pixel by pixel. For example, assume a document shown in FIG. 9, particularly the paragraph beginning with "Chapter 1". Then, as shown in FIG. 10, the CPU 109 determines a rectangular area including the entire paragraph of interest and recognizes the top left coordinates (bsx,bsy) and the bottom right coordinates (bex,bey).

The paragraph recognition (S402) is followed by line recognition (S403) which is executed paragraph by paragraph. Specifically, the CPU 109 recognizes a space between adjoining lines of a paragraph when an area where no image data exist, i.e., a white area extends more than a predetermined distance. Subsequently, the CPU 109 determines the position of the recognized line (S404) by giving coordinates to the image data stored in the input image memory 104 on a pixel basis. For example, considering the line beginning with "from a single" of FIG. 10, the CPU 109 determines a rectangular area including the entire line of interest and then recognizes the top left coordinates (lsx,lsy) and the bottom right coordinates (lex,ley).

Subsequently, the CPU 109 recognizes characters (S405) by use of any conventional technology, e.g., templet matching or topological matching. Then, the CPU 109 separates words on the basis of the recognized characters line by line (S406). To separate a word, the CPU 109 determines whether or not an area where a character does not exist, i.e., a white area extends more than a predetermined distance in the main scanning direction or whether or not a blank character or a punctuation mark or similar division mark exists. On separating a word, the CPU 109 determines the position of the word (S407) by giving coordinates to the image data stored in the input image memory 104 pixel by pixel and determining the coordinates of the word in the image. For example, considering the word "This" of FIG. 10, the CPU 109 determines a rectangular area including the entire word "This" and then recognizes the top left coordinates (wsx,wsy) and the bottom right coordinates (wex,wey) of the rectangular area.

(3)-(ii) Paragraph, Line and Page Combination

Figure 5:
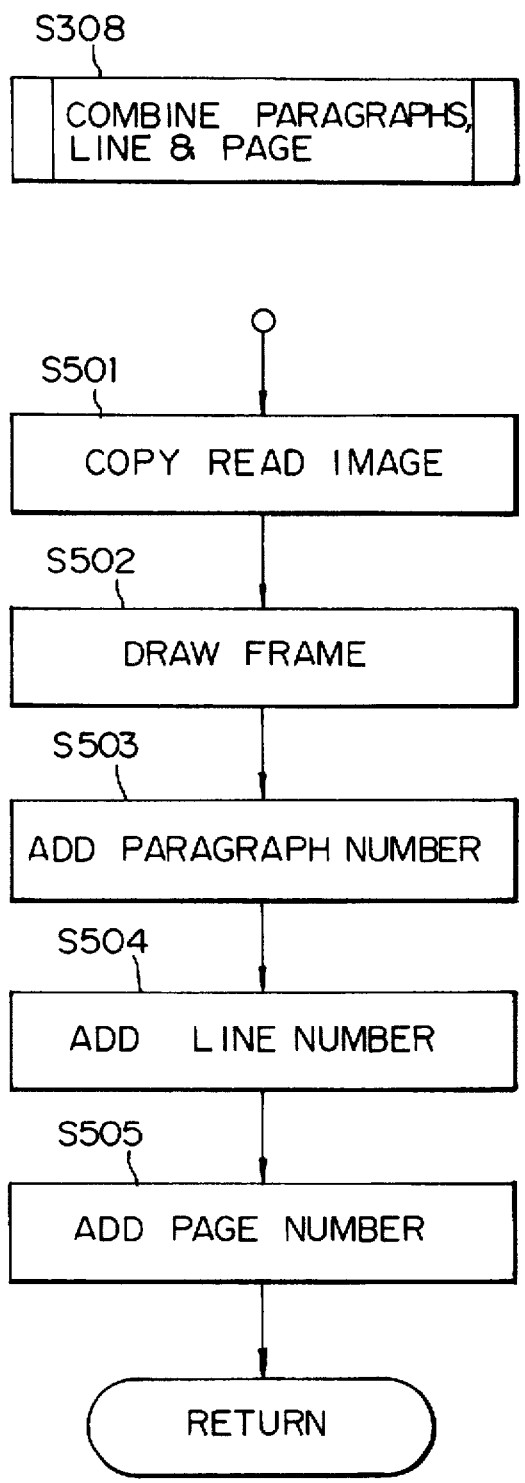

Referring again to FIG. 3, the document recognition (S307) is followed by a step of combining paragraphs, lines and page (S308). Specifically, as shown in FIG. 5, the CPU 109 copies the image data read by the scanner 101 and stored in the input image memory 104 into the output image memory 105 (S501). Subsequently, the CPU 109 draws frames, i.e., rectangles each including an associated one of the paragraphs on the basis of the coordinates determined in step 402 (S502). Specifically, the CPU 109 draws rectangles each having particular diagonal coordinates (bsx, bsy) and (bex,bey). FIG. 11 shows examples of such rectangles. After drawing the rectangles, the CPU 109 combines paragraph numbers with the paragraphs, i.e., adds serial paragraph numbers to the top left of the paragraphs sequentially recognized in step 401 (S503). Specifically, to add paragraph numbers, the CPU 109 reads font data representative of the paragraph numbers out of the output font memory 108 and then stores them in the output image memory 105 by using the coordinates (bsx,bsy) as a reference or start point. FIG. 11 also shows examples of such paragraph numbers.

After adding the paragraph numbers, the CPU 109 combines line numbers with the lines, i.e., adds serial line numbers to the left ends of the lines sequentially recognized in step S403 (S504). Specifically, to add line numbers, the CPU 109 reads font data representative of the line numbers out of the output font memory 108 and then stores them in the output image memory 105 by using the coordinates (lsx,lsy) as a reference or start point. FIG. 11 also shows examples of such line numbers; the line numbers are limited to multiples of "5" by way of example. Finally, the CPU 109 adds a page number counted in step S306 to the bottom center of the image stored in the output image memory 105

(S505). To add a page number, the CPU 109 reads font data representative of the page number out of the font memory 108 and then stores it in the output image memory 105. At this instant, the coordinates of the bottom center of the image stored in the memory 105 are selected as a reference or start point beforehand. FIG. 11 also shows an example of such a page number.

By the above procedure, an image with paragraph numbers, line numbers and a page number is completed in the output image memory 105. This image is printed on a sheet by the printer 114 (S309).

(3)-(iii) Search of Equivalent Dictionary

Figure 6A:
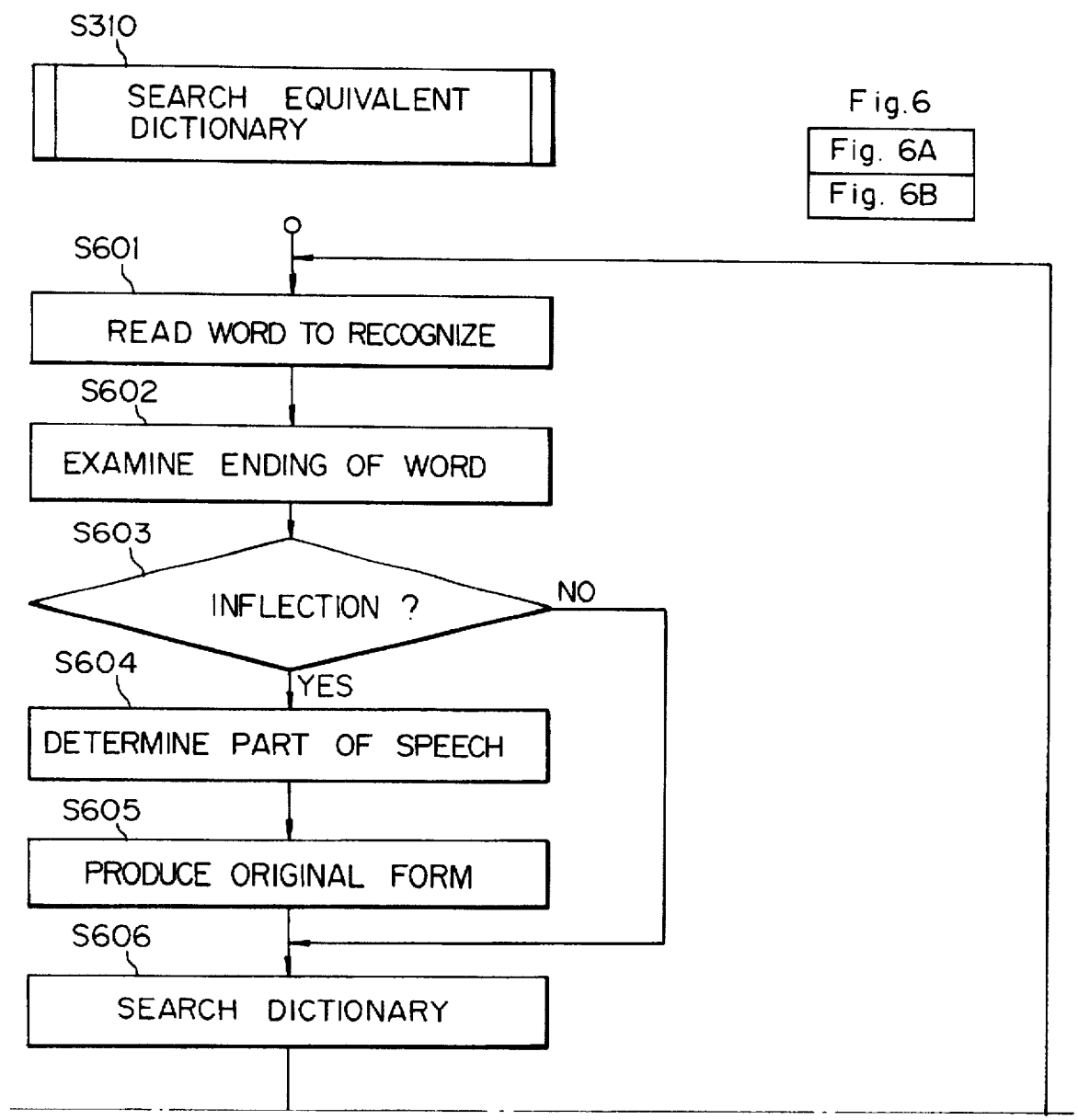
Figure 6B:
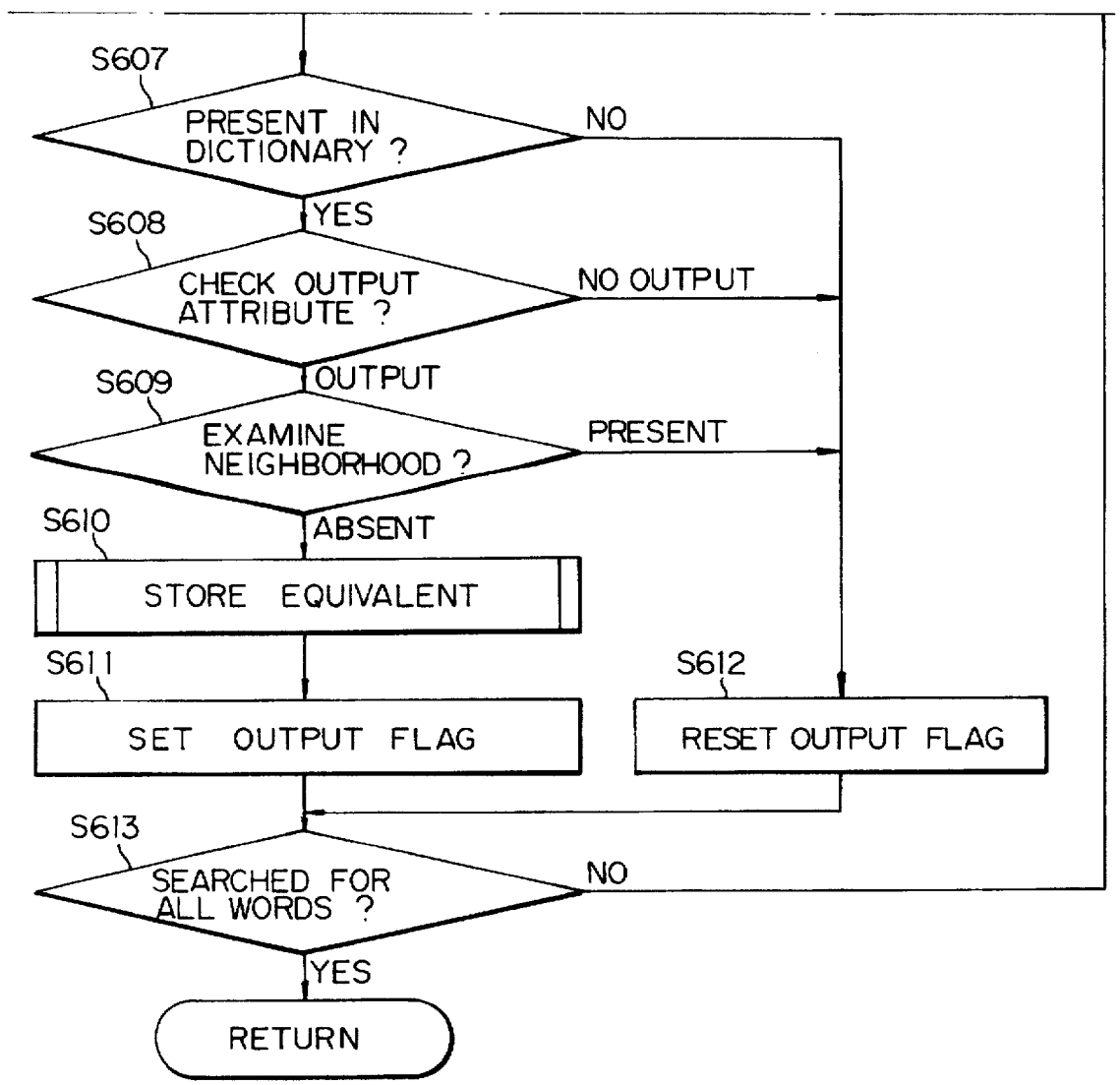
Figure 7:
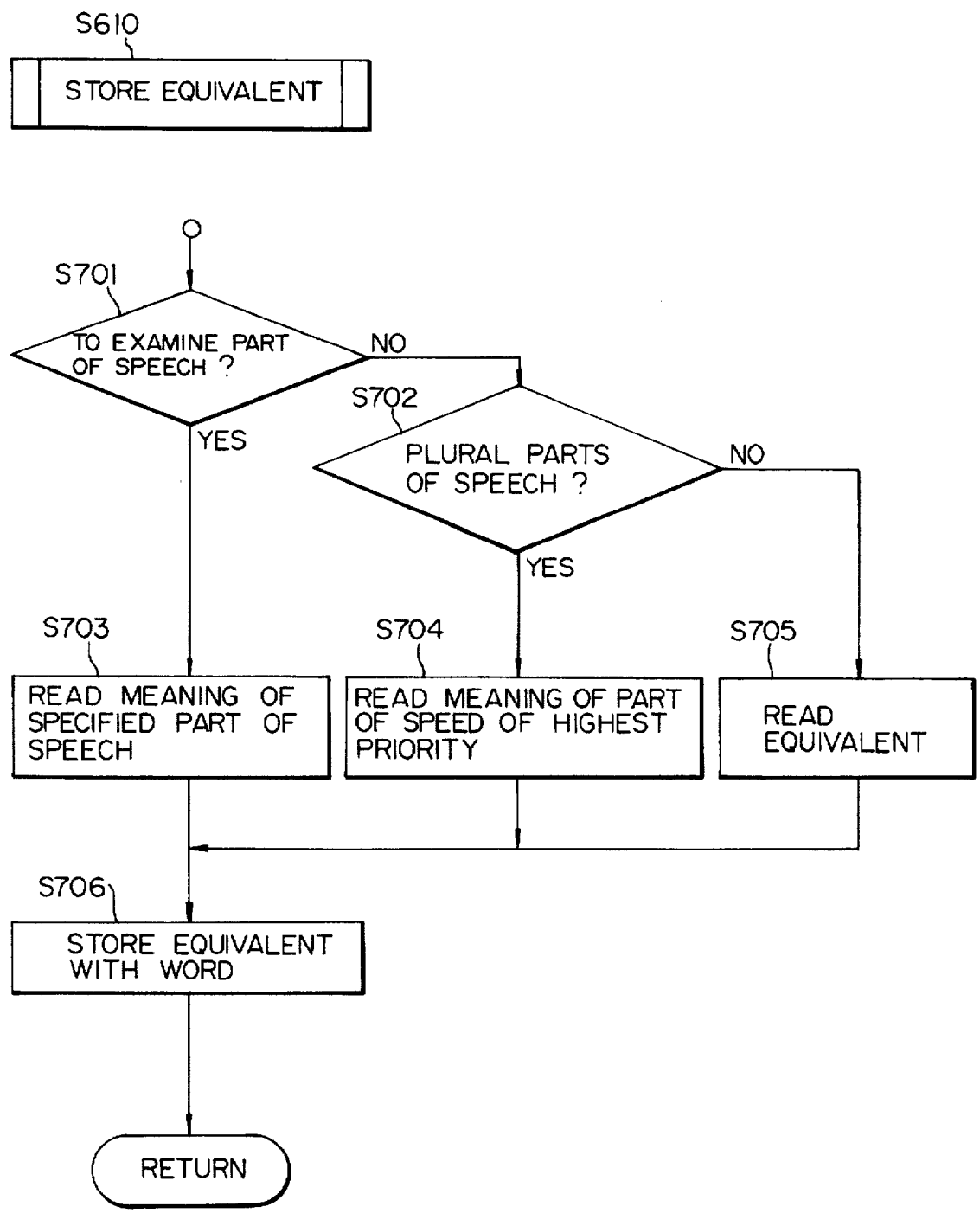

On completing the above procedure, the CPU 109 searches an equivalent dictionary (S310). Specifically, as shown in FIG. 6, the CPU 109 reads one of the words separated and stored in step 406 (S601). Then, the CPU 109 examines the ending of the word (S602) to see if the word is inflected (S603). If the word is inflected (Yes, S603), the CPU 109 determines the part of speech of the word (S604). For example, if the word of interest ends with "s" as an inflection, the CPU 109 determines that it is a noun which can take a plural form; if the word ends with "ed", the CPU 109 determines that it is a verb which can be used in the past tense. Further, if the word is inflected, the CPU 109 determines the original form of the word (S605).

Subsequently, the CPU 109 searches a dictionary by using basically a pattern matching algorithm (S606). Specifically, the equivalent dictionary memory 107 stores words and their equivalents in pairs and also stores output attributes, which will be described, on a word basis. The CPU 109 compares each word read in step 601 with the words stored in the memory 107 character by character to see if the former is identical with any one of the latter (S607). If the answer in step S607 is positive, the CPU 109 determines that a target word exists in the dictionary and then checks the output attribute of the word of interest (S608). Specifically, in step S608, the CPU 109 determines whether or not to actually output the equivalent of the word of interest. For example, simple words which should preferably not be accompanied by equivalents are each registered in the memory 107 together with an attribute indicative of "NO OUTPUT". If the attribute for the word of interest should be outputted (OUTPUT, S608), the CPU 109 determines whether or not the word of interest has already occurred in the vicinity of the current line and the equivalent thereof has already been registered (S609). Specifically, the CPU 109 compares the word of interest with the words, i.e., equivalents stored in step S610, which will be described, character by character to see if the former is identical with any one of the latter. If the answer in step S609 is positive, PRESENT, the CPU 109 determines the word is present in the vicinity of the current line.

(3)-(iv) Storage of Equivalent

When the word of interest is absent in the vicinity of the current line (ABSENT, S609), the CPU 109 reads the word and its equivalent out of the equivalent dictionary memory and stores them (S610). While the memory 107 stores words and their equivalents in pairs, each equivalent is provided with a plurality of different meanings. Priority order is given to such meanings on the basis of the part of speech.

Thereafter, the CPU 109 determines whether or not a part of speech has been determined in step S604 (S701). If the answer in step S701 is positive, the CPU 109 reads the equivalent of the determined part of speech (S703). If the answer in step S701 is negative, the CPU 109 determines whether or not the equivalent has a plurality of parts of speech (S702). If the equivalent has a plurality of parts of speech, the CPU 109 reads one meaning having the highest priority with respect to the part of speech (S704); if otherwise, the CPU 109 reads the equivalent (S705). For example, the word "play" is stored in the memory 107 with the following Japanese equivalent:

play [doshi]asobu; . . . suru; enso suru [meishi]asobi

In this case, the part of speech having the highest priority is doshi (verb) and has three different meanings while the part of speech having the lower priority is meishi (noun) and has a single meaning. Specifically, if the part of speech is determined to be doshi, then "asobu" is read out; if it is determined to be meishi, then "asobi" is read out. Further, when the part of speech is specified, "asobu" having the highest priority is read out. The equivalent so read out is stored together with the matching word (S706).

Referring again to FIG. 6, the CPU 109 sets an output flag for the word whose equivalent has been stored (S611). However, the CPU 109 resets the output flag for a word absent in the dictionary as determined in step 607, a word whose attribute is "NO OUTPUT" as determined in step S608, and a word determined to be "PRESENT" in step S609. The CPU 109 executes the above procedure for all the separated words (S613).

Subsequently, as shown in FIG. 3, the CPU 109 counts the number of pages to be output (S311). Specifically, in the illustrative embodiment, if the amount of image data generated by the image generating means is greater than the amount of image data read out of the document, it will be the case that a single page of a document image is reproduced as a plurality of pages of output images. Therefore, in step S311, the CPU 109 counts the pages of output images and if the page number of the image data read by the image reading means or received over the communication line and the page number of the image generated by the output image generating means are different, the page number adding means adds the page number of the image data to the image generated by the output image generating means.

(3)-(v) Generation of Insertion Image

Figure 8B:
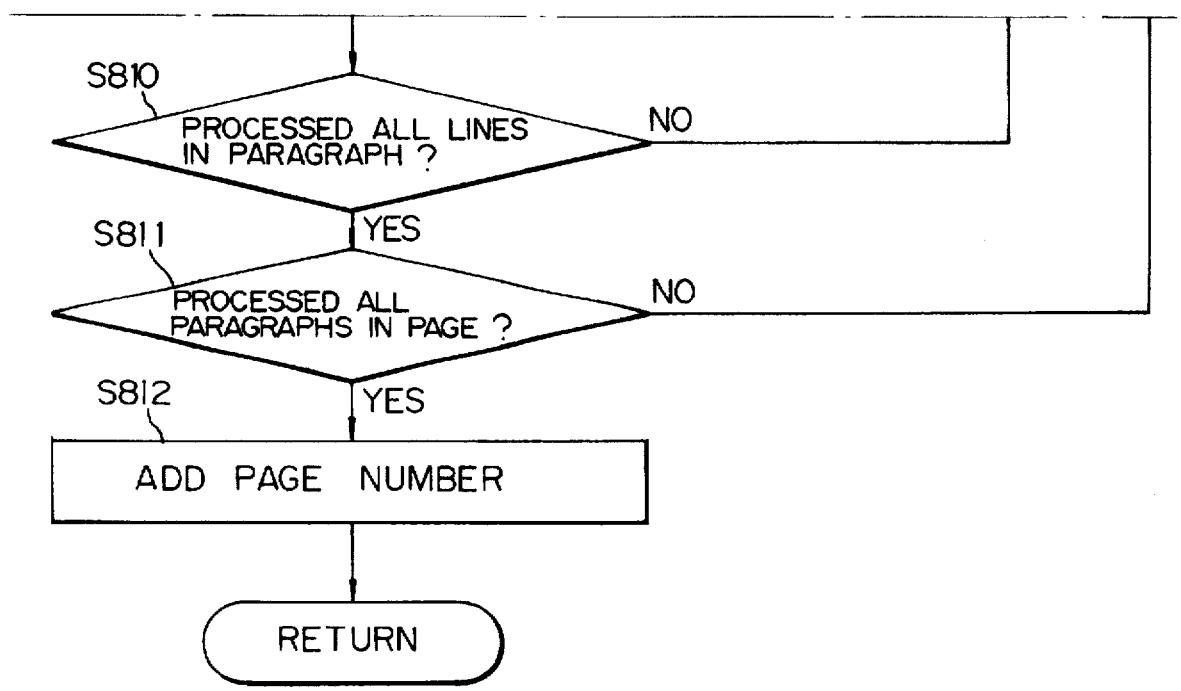

After the above sequence of steps, the CPU 109 generates an image to be inserted (S321). Specifically, as shown in FIG. 8, the CPU 109 sequentially counts the paragraphs recognized in step S401 (S801). Then, the CPU 109 combines paragraph numbers with the consecutive paragraphs (S802). Specifically, the CPU 109 reads font data representative of the paragraph numbers out of the output font memory 108 and then stores them in the output image memory 105. FIG. 12 shows examples of such paragraph numbers. Subsequently, the CPU 109 counts the consecutive lines recognized in step S403 (S803) and then adds line numbers to the lines (S804). To add line numbers, the CPU 109 reads font data representative of the line numbers out of the output font memory 108 and then stores them in the output image memory 105. FIG. 12 also shows examples of such line numbers; the line numbers are limited to multiples of "5" by way of example.

Subsequently, the CPU 109 copies the lines read (S805). Specifically, the CPU 109 separates the rectangular area having the diagonal coordinates (lsx,lsy) and (lex,ley) determined in step S404 out of the image data stored in the input image memory 104, and then copies it to the output image memory 105.

Thereafter, the CPU 109 determines whether the output flag has been set (see S611) or not (see S612) word by word (S806). When the output flag is set for a given word, the CPU 109 reads its equivalent stored in step S610 (S807). Subsequently, the CPU 109 combines the equivalent with the associated word (S808), i.e., reads font data associated with the equivalent out of the output font memory 108 and then writes it in the output image memory 105. At this instant, the reference position (ysx,ysy) in the output image memory 105 is produced from the coordinates (wsx,wsy) and (wex,wey) of the word position, as follows:

$$ysx = wsx + ((wex - wsx) - ylx)/2$$

$$ysy = max(wey) + sly$$

where (ysx,ysy) are the coordinates where the top left of the equivalent should be located, ylx is the length of the stored equivalent in the main scanning direction, max (wey) is the maximum value of wey of each word on one line, and sly is a predetermined value.

As the equivalent is written to the output image memory 105 in the above-described manner, it is outputted under the associated word while being centered with respect to the latter.

Thereupon, the CPU 109 determines whether or not the above processing has been executed for all of the words present on the line (S809) and, if the answer is negative, repeats step S806 and its successive steps. If the answer in step S809 is positive, the CPU 109 determines whether or not the processing has been executed for all the lines constituting the paragraph (S810). If the answer of step S810 is negative, the CPU 109 repeats step S803 and successive steps. If the answer in step S810 is positive, the CPU 109 determines whether or not the processing has been executed for all the paragraphs included in the page (S811). If the answer in step S811 is negative, the CPU 109 repeats the step S801 and successive steps.

After the above sequence of steps, the CPU 109 adds a page number (S812). This step S812 is identical to step S505, FIG. 5, except that the page number of the document image and the page number of the generated image are connected by a hyphen.

Referring again to FIG. 3, the CPU 109 causes the printer 114 to print the image generated in step 312 in the same manner as in step S309 (S313). Thereafter, the CPU 109 determines whether or not the image to be inserted, as distinguished from the original image, has been fully printed (S314). If the answer in step S314 is negative, the program returns to step 311. If the answer in step S314 is positive, the CPU 109 determines whether or not the processing has ended (S315). If the answer of this step S315 is negative, the CPU 109 repeats step S305 and its successive steps for the next document. On completing the procedure described above, the program returns to the step S302.

The embodiments described above have various unprecedented advantages, as follows.

As image data are read or received over a communication line, a paragraph separating means separates paragraphs while a paragraph number adding means adds serial paragraph numbers to the paragraphs. Hence, the document image shown in FIG. 9, for example, may be reproduced with paragraph numbers, as shown in FIG. 11. Character recognizing means recognizes characters included in the document image, and word recognizing means separates words on the basis of the recognized characters. Equivalent storing means stores words and their equivalents therein. Equivalent searching means searches of an equivalent for a given word out of the equivalent storing means and sends it to image generating means. Also sent to the image generating means are the paragraph numbers added by the paragraph separating means and paragraph number adding means. The image generating means generates, in a predetermined format, an image including a recognized word, its equivalent and a paragraph number associated with the word and delivers it to image recording means. As a result, an image including words, their equivalents and paragraph numbers as shown in FIG. 12 specifically can be obtained from the document image of FIG. 9. In the image of FIG. 12, equivalents are added to words in an intelligible arrangement.

Line recognizing means recognizes lines on the basis of the image data read or received over a communication line. Line number adding means adds line numbers to the recognized lines and delivers them to the image recording means. As a result, an image including line numbers as shown in FIG. 12 specifically can be obtained from the document image of FIG. 9. Further, character recognizing means recognizes characters included in the document image while word recognizing means separates words on the basis of the recognized characters. Equivalents storing means storing words and their equivalents and equivalent searching means for searching the equivalent of a given word cooperate to determine the equivalent of a separated word and feeds it to the image generating means. Also fed to the image generating means are the line numbers added by the line recognizing means and line number adding means. The image generating means generates, in a predetermined format, an image including the recognized words and their equivalents as well as the line numbers and delivers them to the image recording means. Consequently, an image including words, their equivalents and line numbers as shown in FIG. 12 specifically can be obtained from the document image of FIG. 9.

Page number storing means delivers the page number of the image data read to the image recording means. Generated page counting means feeds the page number of an image being generated to the image generating means. Further, the character recognizing means recognizes characters included in the document image while the word recognizing means separates words on the basis of the recognized characters. The equivalent storing means and equivalent searching means cooperate to determine the equivalent of a separated word and feeds it to the image generating means. The image generating means generates, in a predetermined format, an image including the recognized words and their equivalents as well as the page number of image data read and the page number of an image generated and delivers it to the image recording means. As a result, an image including words, their equivalents, the page number of the image data read and the page number of an image generated as shown in FIG. 12 specifically can be obtained from the document image of FIG. 9.

The word recognizing means separates words on the basis of characters recognized by the character recognizing means. The equivalent storing means and equivalent searching means cooperate to determine an equivalent for a separated word and delivers it to the image generating means. The image generating means outputs the recognized word and its equivalent while centering the latter under the former and feeds it to the image recording means. As a result, an image in which equivalents are intelligibly centered under associated words as shown in FIG. 12 specifically can be obtained from the document image of FIG. 9.

The word recognizing means separates words on the basis of characters recognized by the character recognizing means. The equivalent storing means and equivalent searching means cooperate to determine an equivalent of a separated word and delivers it to the image generating means. The image generating means outputs the equivalent of the word under the word. At this instant, since the word to be output is the faithful copy of the image data read by the image inputting means, the font and size of original words are preserved in the composite image. Therefore, the resulting image can be readily compared with the original image.

The word recognizing means separates words on the basis of characters recognized by the character recognizing means. The equivalent storing means and equivalent searching means cooperate to determine an equivalent of a separated word and delivers it to the image generating means. The image generating means outputs the equivalent of the word under the word. At this instant, the equivalent searching means recognizes the inflection of each word of the document and selects an equivalent matching the sentence as far as possible. As a result, equivalents matching sentences as far as possible are added to associated words.

The word recognizing means separates words on the basis of characters recognized by the character recognizing means. The equivalent storing means and equivalent searching means cooperate to determine an equivalent of a separated word and delivers it to the image generating means. The image generating means outputs the equivalent of the word under the word. At this instant, the actual output of equivalents is controlled on the basis of attributes stored in the equivalent storing means. Specifically, words which should preferably not be outputted are not outputted.

The word recognizing means separates words on the basis of characters recognized by the character recognizing means. The equivalent storing means and equivalent searching means cooperate to determine an equivalent of a separated word and delivers it to the image generating means. The image generating means outputs the equivalent of the word under the word. At this instant, when the equivalent of a given word has already occurred in the vicinity of the word of interest, it is not outputted. As a result, the resulting composite image is clear and easy to see.

The word recognizing means separates words on the basis of characters recognized by the character recognizing means. The equivalent storing means and equivalent searching means cooperate to determine an equivalent for a separated word and delivers it to the image generating means. The image generating means outputs the equivalent of the word under the word. At this instant, image data generated are stored in an output image memory independent of an input image memory which stores image data read. This allows the image data to be processed afterwards without the document being read again, thereby enhancing high speed processing.

In the illustrative embodiments, the various kinds of control are implemented by software. However, the software may be partly or entirely replaced with hardware to promote high speed processing.

In summary, it will be seen that the present invention provides an image forming apparatus which intelligibly positions the equivalents of words included in a document image, outputs an image in an easy-to-see layout even when the equivalents noticeably change the contents of the image, and promotes high speed processing.

Various modifications will become possible for those skilled in the art after receiving the teachings of the present disclosure without departing from the scope thereof.

What is claimed is:

1. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

equivalent searching means for searching for the equivalent of words read out from said equivalent storing means;

output image generating means for outputting the equivalent searched for by said equivalent searching means together with the word corresponding to said equivalent;

paragraph separating means for separating paragraphs included in the image data;

paragraph mark adding means for adding paragraph marks to the paragraphs separated by said paragraph separating means; and image generating means for generating an image by adding the paragraph marks to the image data.

2. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for the equivalent of the word read out of said equivalent storing means;

output image generating means for outputting the equivalent searched for by said equivalent searching means together with the word corresponding to said equivalent;

line recognizing means for recognizing lines on the basis of the image data;

line number adding means for adding line numbers to the lines recognized by said line recognizing means;

image generating means for generating an image by adding the line numbers to the image data; and priority setting means for setting an order of priority of alternative meanings for words having a plurality of different meanings so that when equivalents are to be read out by said output image generating means, the meanings with the highest priority will be read out in correspondence with said words having the plurality of different meanings.

3. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for the equivalent of the word read out of said equivalent storing means;

output image generating means for outputting the equivalent searched for by said equivalent searching means together with the word corresponding to said equivalent;

page number adding means for adding a page number to the image generated by said output image generating means; and priority setting means for setting an order of priority of alternative meanings for words having a plurality of different meanings so that when equivalents are to be read out by said output image generating means, the meanings with the highest priority will be read out in correspondence with said words having the plurality of different meanings.

4. An apparatus as claimed in claim 3, further comprising:

means for altering the number outputted from said page number adding means, wherein said means for altering is responsive to a comparison of the page number of image generated by the output image generating means and image data read by either the image reading means or received over the communication line.

5. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for the equivalent of the word read out of said equivalent storing means;

output image generating means for outputting the equivalent searched for by said equivalent searching means together with the word corresponding to said equivalent;

equivalent combining means for outputting the equivalent outputted by said output image generating means under the word corresponding to said equivalent while centering said equivalent with respect to said word; and priority setting means for setting an order of priority of alternative meanings for words having a plurality of different meanings so that when equivalents are to be read out by said output image generating means, the meanings with the highest priority will be read out in correspondence with said words having the plurality of different meanings.

6. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for the equivalent of the word read out of said equivalent storing means;

output image generating means for outputting the equivalent searched for by said equivalent searching means together with the word corresponding to said equivalent; and copying means for copying the equivalent corresponding to the word to be outputted by said output image generating means if the word to be outputted is of a specified type, otherwise said equivalent is not copied.

7. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for an equivalent of the word read out of said equivalent storing means;

output image generating means for outputting the equivalent searched for by said equivalent searching means together with the word corresponding to said equivalent;

inflection determining means for determining whether an inflection of the word searched for by said equivalent searching means exists; and equivalent reading means for reading out an equivalent matching a portion of the word other than said inflection determined by said inflection determining means;

priority setting means for setting an order of priority of alternative meanings for words having a plurality of different meanings so that when equivalents are to be read out by said output image generating means, the meanings with the highest priority will be read out in correspondence with said words having the plurality of different meanings.

8. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for the equivalent of the word read out of said equivalent storing means;

output image generating means for outputting the equivalent searched for by said equivalent searching means together with the word corresponding to said equivalent;

control means for controlling storage of the equivalent on the basis of predetermined characteristic data corresponding to said equivalent.

9. An image forming apparatus having an interlinear function, comprising:

image reading means for optically reading a document image to convert said document image to corresponding image data;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for the equivalent of the word read out of said equivalent storing means;

output image generating means for outputting the equivalent searched for by said equivalent searching means together with the word corresponding to said equivalent; and control means for storing equivalents already having occurred before an equivalent of interest to thereby control output of said equivalent of interest.

10. An image forming apparatus having an interlinear function, comprising:

image reading means for optically reading a document image to convert said document image to corresponding image date;

image storing means for storing the image data read by said image reading means or image data received over a communication line;

image processing means for executing various kinds of image processing with the image data to produce an image signal;

image recording means for recording an image on a recording medium in response to the image signal from said image processing means;

character recognizing means for recognizing characters included in the image data read by said image reading means or the image data received over the communication line;

word separating means for separating words on the basis of the characters recognized by said character recognizing means;

equivalent storing means for storing the words separated by said word separating means and equivalents of said words;

means for reading out a word from said equivalent storing means responsive to said word separating means;

equivalent searching means for searching for the equivalent of the word read out of said equivalent storing means;

output image generating means for outputting the equivalent searched for by said equivalent searching means together with the word corresponding to said equivalent;

inflection determining means for determining whether an inflection of the word searched for by said equivalent searching means exists; and an output image memory to be used by said output image generating means independently of an input image memory to be used by said image storing means;

priority setting means for setting an order of priority of alternative meanings for words having a plurality of different meanings so that when equivalents are to be read out by said output image generating means, the meanings with the highest priority will be read out in correspondence with said words having the plurality of different meanings.

11. An image processing apparatus comprising:

image reading means for reading an image;

character recognizing means for recognizing characters included in the image;

word separating means for separating words on the basis of the characters recognized by said character recognizing means;

equivalent storing means for storing the words separated by said word separating means and equivalents of said words;

translating means for converting the characters recognized to corresponding characters or words of another language; and control means for combining the characters recognized and the characters of another language, and for locating said characters recognized under the characters of the other language while centering the characters recognized with respect to the characters of the other language, from the image read to thereby output a composite image;

priority setting means for setting an order of priority of alternative meanings for words having a plurality of different meanings so that when equivalents are found, the meanings with the highest priority will be read out in correspondence with said words having the plurality of different meanings.

12. An apparatus as claimed in claim 11 wherein said translating means classifies characters into a group which does not need outputting and a group which needs outputting.

* * * * *